Patented Oct. 3, 1939

2,174,629

UNITED STATES PATENT OFFICE 2,174,629

PROCESS FOR PRINTING AND PHOTOGRAPHING AND MATERIAL THEREFOR

Anton F. Greiner, Detroit, Mich.

No Drawing. Application September 9, 1935, Serial No. 39,824. In Germany September 15, 1934

18 Claims. (Cl. 95—7)

The invention relates to improvements in sensitized coatings useful in the photographic and printing field and relates also to methods for obtaining such coatings and utilizing the same to promote the progress in this and allied arts.

In the present state of the art, certain sensitized coatings such as albumen, gelatin, glue, gum arabic, etc. have been used in offset printing, photoengraving plants and other places in the photographic printing field. Such coatings have had many disadvantages and have often been responsible for spoiled work and disappointment to the craftsman employed in this field.

One of the objects of my invention is to provide an improved sensitized coating eliminating the disadvantages of the coatings of the prior art and possessing many new advantages.

Other objects of my invention are to provide new devices useful in the field and new methods of printing and photography.

After considerable systematic research I have discovered a new sensitized coating comprising essentially polymerized vinyl alcohol either with or without additional chemicals as hereinafter more fully pointed out. The new sensitized coating gives far better results than any of the other materials previously known and possesses elasticity, smoothness of surface, resistance to wear and long life far superior to any other coating so far known.

Polymerized vinyl alcohol used in accordance with my invention is initially obtained usually in the form of a powder having the formula $(CH_2:CHOH)_n$ and may be obtained in a large number of varieties differing in characteristics from one another according to the difference of their polymeric degree. In general, the degree of polymerization ranges from a compound having the above formula where $n$ equals 20 to one where $n$ equals 350. This range, however, may be subdivided into compounds having low polymeric degree such for example as those compounds where $n$ is between 20 and 100; compounds of a medium polymeric degree where $n$ is between 100 and 200; and compounds of high polymeric degree where $n$ is from 200 to 350 or above. Naturally, there is no sharp line of division between the various modifications and the classification given above is mainly for the purpose of convenience in considering the various combinations and sub-combinations covered by my invention. In general it may be said that the low molecular modifications have a greater degree of light sensitivity and are employed particularly where speed is required, while the modifications of high polymeric degree have greater resistance to wear and are, therefore, used where this factor is the main requirement. In many cases polymerized vinyl alcohol of medium polymeric degree will best serve the desired aim. In preparing sensitized coatings in accordance with my invention the polymerized vinyl alcohol has incorporated therein a suitable catalyst such that when the coatings are exposed to actinic rays the polymerized vinyl alcohol is chemically changed into a hardened mass more resistant to the action of solvents than unexposed material. For example, the catalyst may be a soluble bichromate such as ammonium bichromate. This gives an excellent sensitized coating. On the other hand, other catalytic agents may be substituted for bichromates such as tung oil. Various other materials which from the prior art are known to have a similar catalytic effect on albumen and other coatings may also be used as catalysts with the polymerized vinyl alcohol.

The polymerized vinyl alcohol, preferably in powdered form, is dissolved in water and the temperature is raised to a point from 150° F. to 180° F. for a sufficient time to convert the powder into a slimy, gummy liquid. The lower the polymeric degree of the original substance, the lower the temperature and the shorter time required for preparing the liquid. Conversely, the higher the polymeric degree, the higher temperature and longer time required. The temperature, however, should never exceed substantially 180° F. in order to secure the best coatings. The catalyst is then incorporated into the cooked liquid and the material may then be spread out in a thin film on any suitable backing material and allowed to dry. The film must, of course, be kept in the dark until it is ready for use for photographing or printing purposes.

The new material is adapted to any printing form, cylinder, plate, block, etc. Its photo-chemical reaction to light is far greater than the known materials and consequently the time of exposure required is shorter than that of known materials. If a photographic screened negative is printed on a sensitized plate of polymerized vinyl alcohol the outlines of the dots are sharper cut than in the case of albumen plates, for example. Since the new coating is acid resisting, the sharp outlines of the dots are maintained even when the acidity of water used for developing purposes is very high. It is a well known fact that with the usual sensitized plate materials water of high acidity will destroy screened dots very quickly necessitating in most cases the making of a new plate.

Plates made with polymerized vinyl alcohol last longer, give less trouble during the printing operation and consequently give a greater number of prints per plate per hour than plates of the prior art such as albumen plates. Plates made with polymerized vinyl alcohol are little affected when printing on cheap paper while it is a well known fact that such paper, which is dirty and sandy, ruins albumen plates in a very short time, sometimes within an hour. Therefore, one of the advantages of polymerized vinyl alcohol plates is that it permits good prints to be made on cheap paper. When a photographic screened positive is printed on a sensitized coating using polymerized vinyl alcohol the highlight dots can be better maintained than on other plates using, for example, glue or gum.

My invention also contemplates the use of polymerized vinyl alcohol in chemical combinations with other chemical compounds such as acetates, ethers, esters and their derivatives, such for example as methylcellulose, cellulose ether, polyvinyl ether, alkyl ether and other similar compounds known to the art. Since the number of combinations which can be made up with these ingredients is almost unlimited, it is possible according to my invention to make such fine gradations that every requirement in photographic offset, rotogravure and photo-engraving can be fulfilled.

The polymerized vinyl alcohol in any of its polymeric degrees or in any of its partial combinations with other chemicals as outlined above may also be combined with other materials heretofore used in the art such as albumen, glue, gum, etc. I have found that the incorporation of polymerized vinyl alcohol in combination with sensitized coatings of previously known compositions improves the properties of such compositions. It should also be noted that polymerized vinyl alcohol and its partial derivatives also permits a perfect union with pigments and dyes, especially aniline dyes. The elasticity of coatings of polymerized vinyl alcohol and its partial derivatives can be greatly increased with the addition of glycols, such as ethylene glycol, butylene glycol, glycerine, etc. Its muscular structure, that is, its toughness and strength, can be increased by adding borax, sulfocyanides, sugars, etc.

Unlike all natural materials used so far in the art, such as albumen, gum, etc., which always vary a great deal in their chemical and physical properties and decompose and become useless sometimes within a few days, my new coatings comprising polymerized vinyl alcohol maintain their standard quality and properties and can be kept under perfect condition during the manufacturing process and can be kept indefinitely as they do not decompose.

The working operations for coating and decoating printing bodies such as plates, cylinders, etc. are similar to the ones now used in the art. For decoating it is satisfactory to use water, steam, mineral acids, organic acid solutions and other materials. After decoating the plates are easily cleaned, grained and recoated.

My invention is applicable to many uses in the photographic printing field which will be readily apparent to those skilled in the art from the previous description and the examples hereinafter given.

Example I

A zinc or aluminum plate is first treated in the usual way known to the art in order to prepare the same for a sensitized coating. The plate is, according to the usual practice, deoxidized, watered, counter-etched, watered and then coated with a sensitized coating. Assuming that the plate is to be used for ordinary purposes where no special light sensitivity is required and no special resistance to wear is needed, the sensitized coating used is preferably one having a medium polymeric degree. Thus the polymeric vinyl alcohol $(CH_2:CHOH)_n$ is selected to have $n$ between 100 and 200, say 150. 5% of this compound is dissolved in water and cooked at a temperature below 180° F. as previously described. A 4% ammonium bichromate solution is incorporated in the cooked liquid in the proportion of four parts of ammonium bichromate solution to forty parts of the cooked liquid. This material may then be kept in a suitable receptacle until it is desired to utilize the same for making a coated plate. The solution is poured upon the plate prepared as above and dried and is then ready for use. Since the plate is sensitized it must be kept from actinic rays until it is printed. A coating prepared as above requires an exposure to light of approximately two minutes whereas an albumen coating would, for the same printing operation, require a seven minute exposure. The plate is then developed in water during which operation the portions of the coating which have not been subjected to light are washed away, leaving the exposed portions in relief. The plate may then be dried and finished in the known way. If, for example, the plate were printed from a screened negative the plate after drying may be used for printing, the hardened coated surfaces taking the ink and printing on the paper. The plate may alternately be exposed to light through a screened positive and utilized in the known manner.

Example II

Where it is desired to provide a printing device for use with a long run or cheap paper the directions given under Example I are modified. In such cases it is preferable to use a polymerized vinyl alcohol of high polymeric degree where $n$ is from 200 to 350, say for example, 300. In this case only 3% of the polymerized vinyl alcohol is cooked and the temperature and the time of cooking may be somewhat less than that for Example I. The cooked solution is mixed with 2% glycol, 1½% borax and 4% ammonium bichromate. The plate is otherwise prepared in the same manner as given in Example I.

Example III

The invention is also applicable to making photographic plates or films. In this case a glass plate or transparent film is prepared in the usual manner for a sensitized coating and the coating is prepared as given in Examples I or II, or in accordance with any of the directions previously given. After development the exposed portions of the coating remain on the transparent backing and these may be stained or otherwise treated to make a photographic negative or positive as the case may be.

What I claim as my invention is:

1. A sensitized coating for photographic and printing purposes comprising polymerized vinyl alcohol and a catalyst reactive with said polymerized vinyl alcohol in the presence of actinic rays to render the same less soluble.

2. A composition adapted for photographic and printing purposes comprising polymerized vinyl alcohol and a soluble bichromate.

3. A composition adapted for photographic and printing purposes comprising polymerized vinyl alcohol and ammonium bichromate.

4. A sensitized coating for photographic and printing purposes comprising polymerized vinyl alcohol of low polymeric degree having the formula $(CH_2{:}CHOH)_n$, where $n$ is between 20 and 100, and a catalyst reactive with said polymerized vinyl alcohol in the presence of actinic rays to render the same less soluble.

5. A sensitized coating for photographic and printing purposes comprising polymerized vinyl alcohol of medium polymeric degree having the formula $(CH_2{:}CHOH)_n$, where $n$ is between 100 and 200, and a catalyst reactive with said polymerized vinyl alcohol in the presence of actinic rays to render the same less soluble.

6. A sensitized coating for photographic and printing purposes comprising polymerized vinyl alcohol of high polymeric degree having the formula $(CH_2{:}CHOH)_n$, where $n$ is between 200 to 350, and a catalyst reactive with said polymerized vinyl alcohol in the presence of actinic rays to render the same less soluble.

7. A composition adapted for photographic and printing purposes comprising polymerized vinyl alcohol, a catalyst reactive with said polymerized vinyl alcohol in the presence of actinic rays to render the same less soluble and one or more coating materials of the class consisting of albumen, glue, fish glue, gelatin and gum.

8. A composition adapted for photographic and printing purposes comprising polymerized vinyl alcohol, a catalyst reactive with said polymerized vinyl alcohol in the presence of actinic rays to render the same less soluble and a soluble auxiliary material of the class consisting of acetates, ethers, esters, cellulose ether, methylcellulose, polyvinyl ether and alkyl ether.

9. A composition adapted for photographic and printing purposes comprising polymerized vinyl alcohol, a catalyst reactive with said polymerized vinyl alcohol in the presence of actinic rays to render the same less soluble and a material of the class consisting of glycols, sugars, borax and sulfocyanides.

10. A printing device comprising a base and a composition on said base having a configuration simulating the copy to be reproduced, said composition comprising the less soluble reaction product of polymerized vinyl alcohol which has been subjected to actinic rays in the presence of a catalyst.

11. A photographic device comprising a transparent base and a composition on said base having a configuration simulating the copy to be reproduced, said composition comprising the less soluble reaction product of polymerized vinyl alcohol which has been subjected to actinic rays in the presence of a catalyst.

12. The method of reproducing copy comprising forming a film comprising polymerized vinyl alcohol and a catalyst adapted to harden the polymerized vinyl alcohol in the presence of actinic rays, exposing said film to actinic rays through a photographic screened copy and developing to remove the non-exposed portions of said film.

13. The method of making a coating for photographic and printing purposes comprising dissolving in water polymerized vinyl alcohol having the formula $(CH_2{:}CHOH)_n$, where $n$ is from 20 to 350, heating to a temperature less than 180° F. until a gummy liquid is produced, adding ammonium bichromate, spreading the mixture thus produced on a backing material and drying.

14. A device for printing and photographic purposes comprising a base and a coating on said base having a configuration simulating the copy to be reproduced, said coating comprising the less soluble reaction product of polymerized vinyl alcohol and ammonium bichromate which has been subjected to actinic rays.

15. A composition adapted for photographic and printing purposes comprising polymerized vinyl alcohol, a catalyst reactive with said polymerized vinyl alcohol in the presence of actinic rays to render the same less soluble and a dye.

16. The method of producing a photographic or printing device which comprises forming a film comprising polymerized vinyl alcohol, and a catalyst reactive with said polymerized vinyl alcohol in the presence of actinic rays to render the same less soluble, and exposing said film to actinic rays corresponding to a predetermined pattern and developing to remove the non-exposed portions of said film.

17. The method of producing a photographic or printing device which comprises forming a film comprising polymerized vinyl alcohol and an alkali bichromate, exposing said film to actinic rays corresponding to a predetermined pattern and developing to remove the non-exposed portions of said film.

18. An article for photographic and printing purposes comprising polymerized vinyl alcohol and an agent of the class consisting of an unreacted catalyst reactive with said polymerized vinyl alcohol in the presence of actinic rays and an actinic ray-activated catalyst.

ANTON F. GREINER.